US006926554B2

(12) United States Patent
Liow et al.

(10) Patent No.: US 6,926,554 B2
(45) Date of Patent: Aug. 9, 2005

(54) PORTABLE DEVICE CONNECTION APPARATUS AND SYSTEM

(75) Inventors: Yuen Khim Liow, Singapore (SG); Siang Thia Goh, Singapore (SG)

(73) Assignee: Creative Technology Limited, Singapore (SG)

( * ) Notice: Subject to any disclaimer, the term of this patent is extended or adjusted under 35 U.S.C. 154(b) by 0 days.

(21) Appl. No.: 10/719,128

(22) Filed: Nov. 20, 2003

(65) Prior Publication Data

US 2005/0112938 A1   May 26, 2005

(51) Int. Cl.$^7$ ............................................ H01R 13/60
(52) U.S. Cl. ....................................... 439/528; 439/501
(58) Field of Search ................................ 439/528, 501; 191/12.4

(56) References Cited

U.S. PATENT DOCUMENTS

| | | | |
|---|---|---|---|
| 3,705,962 A | 12/1972 | Banister | |
| 4,384,688 A | 5/1983 | Smith | |
| 5,028,746 A | 7/1991 | Petrich | |
| 5,590,749 A | 1/1997 | Wagner et al. | |
| 5,941,648 A * | 8/1999 | Robinson et al. | 400/82 |
| 6,088,021 A | 7/2000 | Yong | |
| 6,327,508 B1 | 12/2001 | Buchan | |
| 6,334,788 B1 | 1/2002 | Sakaguchi et al. | |
| 6,364,697 B1 * | 4/2002 | Tseng et al. | 439/533 |
| 6,415,898 B1 * | 7/2002 | Liao | 191/12.4 |
| 6,421,044 B2 | 7/2002 | Murphy | |
| 6,616,080 B1 | 9/2003 | Edwards et al. | |
| 6,705,891 B1 * | 3/2004 | Lin | 439/528 |
| 6,717,818 B1 | 4/2004 | Lin | |
| 2001/0019002 A1 | 9/2001 | Walters, et al. | |
| 2004/0105230 A1 | 6/2004 | Lin | |

FOREIGN PATENT DOCUMENTS

WO   WO 91/03852   3/1991

OTHER PUBLICATIONS

PCT International Search Report, International Application No. PCT/SG2004/000379; International Filing Date, Nov. 19, 2004; mailing date, Jan. 6, 2005 (9 pp.).

* cited by examiner

*Primary Examiner*—Ross Gushi
(74) *Attorney, Agent, or Firm*—Blakely, Sokoloff, Taylor & Zafman; Stephen M. De Klerk (57) ABSTRACT

A portable device comprising a casing with at least one function key, a recess in a wall of the casing for accommodating a connector when the connector is not in use, a connector cable for permanently connecting the connector to an internal circuitry of the portable device; the recess being sized, shaped and located to as to not interfere with operation of the plurality of function keys; the connector, when in the recess, having a side surface substantially coplanar with the wall. The connector and the connector cable are for enabling: data transfer both ways between the portable device and another device, and one-way power from the another device to the portable device, when the another device is a host for the portable device; and data transfer both ways between the potable device and the another device, and power both ways between the portable device and the another device, when the portable device is the host for the another device.

30 Claims, 6 Drawing Sheets

PORTABLE DEVICE CONNECTION APPARATUS AND SYSTEM

FIELD OF THE INVENTION

This invention relates to a portable device connection apparatus and system and refers particularly, though not exclusively, to a retractable connector for use with portable electronic devices.

BACKGROUND TO THE INVENTION

There are many different portable electronic devices such as, for example, mobile telephones, cellular telephone, personal information assistants ("PIA's") personal digital assistants ("PDAs"), games consoles, and so forth ("portable device"). Many store data that may be also stored and/or used elsewhere such as, for example, on personal computer, laptop computer, notebook computer, and so forth ("computer"). Connecting the portable device to the computer normally requires a cable having a relatively standard connector at one end (e.g. USB, IEEE 1394) for connection to the computer, and at the other end a connector specific for the particular portable device. There are many different manufacturers for portable devices, and quite often they require connectors that are specific for their products, and that cannot be used with products of other manufacturers. Quite often they cannot be used with different products from the same manufacturer.

Therefore, the cost of cables becomes high, as production runs are relatively low. Also, users may require a different cable for each portable device. This not only adds to cost, but also can add to the "cable clutter" the user may experience in storing, transporting and using a number of different cables. It may also cause confusion and the user may try to use the incorrect cable with a portable device.

A direct solid connection is not possible due to the inherent weight of the portable device, and the nature of the physical locations of the connection points in computers.

SUMMARY OF THE INVENTION

According to one aspect of the invention there is provided a connection apparatus for a portable device, the connection apparatus including a recess in a wall of the portable device for releasably receiving therein a connector and a connector cable; the connector cable having an inner end for permanent connection to internal circuitry of the portable device, and an outer end connected to the connector; the connector and the connector cable being for enabling:

a. data transfer both ways between the portable device and another device, and power one way to the portable device from the another device, when the another device is a host for the portable device; and
   b. data transfer both ways between the portable device and the another device, and power transfer to and from the portable device and the another device, when the portable device is the host for the another device.

In another preferred form the invention provides a portable device comprising a casing with at least one function key, a recess in a wall of the casing for accommodating a connector when the connector is not in use, a connector cable for permanently connecting the connector to an internal circuitry of the portable device; the recess being sized, shaped and located to as to not interfere with operation of the at least one function key; the connector, when in the recess, having a side surface substantially coplanar with the wall.

The connector and the connector cable may be for enabling:

a. data transfer both ways between the portable device and another device, and one way power to the portable device from the another device, when the another device is a host for the portable device; and
   b. data transfer both ways between the portable device and the another device, and power transfer from the portable device to the another device, when the portable device is the host for the another device.

The connector may be one of USB, and IEEE 1394; the connector cable being connected to the connector at a first side of the connector.

For both forms, the recess may be sized, shaped and located to not interfere with any operation of a plurality of keys of the portable device, and may have two parallel opposed side walls, and a rear wall extending between and jointing the opposed side walls; a lower wall and a top wall both extending between and joining the two opposed side walls and the rear wall, the lower wall being spaced from and parallel to the top wall; there being a gap in the rear wall for passage therethrough of the cable; the cable passing through the gap at an angle to the rear wall, the angle being in the range 30° to 60°.

There may be a projection extending from a first wall of the two parallel, opposed side walls towards the second wall of the two parallel, opposed side walls; the projection having an inner end spaced from the second wall by a distance substantially the same as a length of the connector; the projection also having an inner curved surface to facilitate the connector cable forming a curved shape when in the recess.

The apparatus may include a retaining clip to releasably retain the connector in the recess when the connector is not in use. The retaining clip may be a spring arm extending outwardly from a rear wall of the recess and having a ball projection adapted to engage a correspondingly sized and shaped recess in a top of the connector, and/or a small projection integrally formed with a side wall of the recess such that the connector engages behind the small projection in the manner of a snap fit.

The first wall may be spaced from the second wall by a distance greater than the length of the connector. When the connector is in the recess, the connector cable may pass between the connector and the rear wall and biases the connector away from the rear wall; and the first side surface of the connector may be substantially coplanar with the wall

BRIEF DESCRIPTION OF THE DRAWINGS

In order that the invention may be better understood and readily put into practical effect, there shall now be described by way of non-limitative example only preferred embodiments of the present invention, the description being with reference to the accompanying illustrative drawings in which.

DETAILED DESCRIPTION OF THE PREFERRED EMBODIMENTS

To refer to FIGS. 1 to 5 of the drawings, there is shown a portable device 10 that, in this embodiment, is a mobile telephone. However, it can also be any form of other portable device such as, for example, PDA, PIA, games console, and so forth. The portable device 10 has a number of keys 12 and a screen 14, in the usual manner, all within or on a casing 16.

The casing 16 has an end wall 18 in which there is a recess 20 releasably holding a connector 22 when the connector 22 is not in use. The recess 20 may be in another wall of the casing 16, if desired or required. The recess 20 is sized, shaped and located such that it does not interfere with the operation of keys 12, or any other function of the portable device 10.

Figure 4:
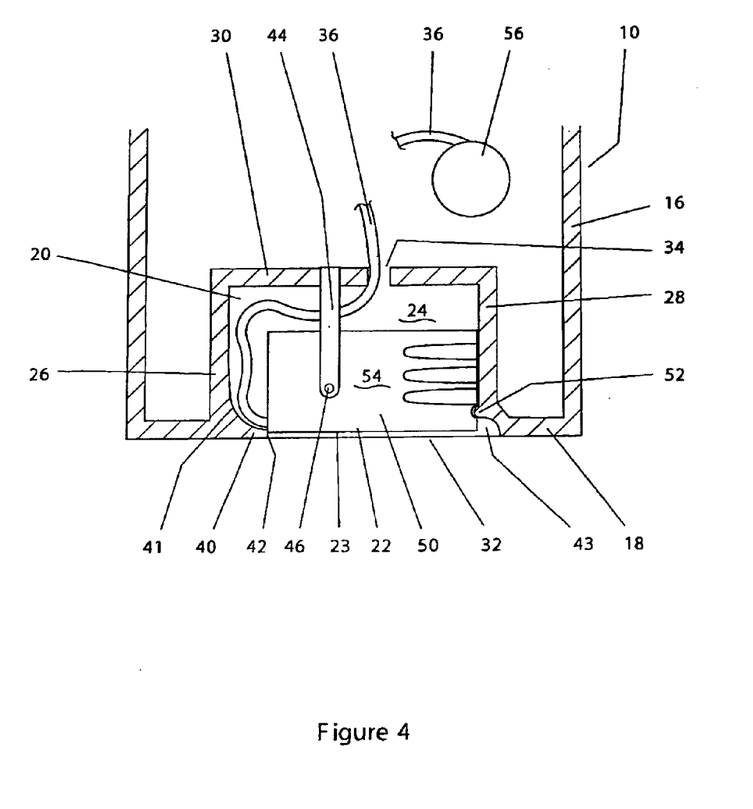
FIG. 4 is a horizontal cross-sectional view along the lines and in the direction of arrows 4—4 on FIG. 1.
Figure 5:
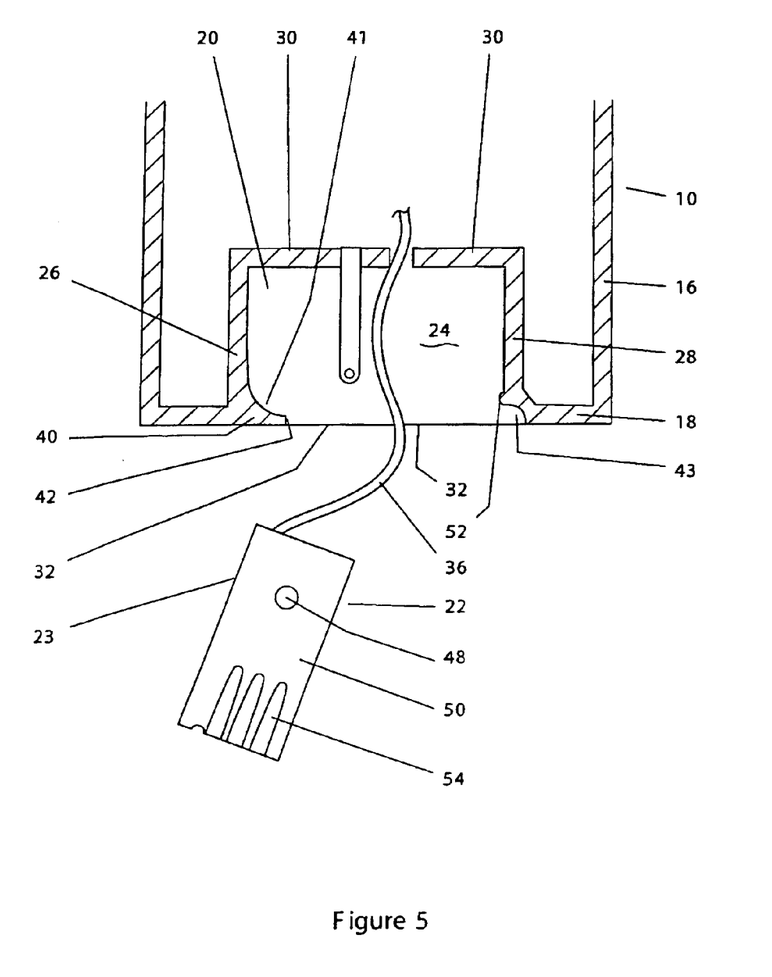
FIG. 5 is a horizontal cross sectional view along the lines and in the direction of arrows 5—5 on FIG. 2.

The recess 20 preferably is generally cuboid and has a lower wall 24, first side wall 26, second side wall 28 spaced from and generally parallel to first side wall 26, an end wall 30 extending between and joining walls 26 and 28, and a top wall (not shown) so that recess 20 is closed on all sides except for opening 32. The top and lower walls 24 are generally parallel and extend between and join walls 26, 28 and 30.

In one of the walls 24, 26, 28, 30, but preferably end wall 30, there is a gap 34 through which passes a cable 36 permanently connected at its inner end (not shown) to the internal circuitry (not shown) of portable device 10, and at its outer end is connected to connector 22. Cable 36 is preferably flexible and may be of any suitable type required for connector 22 including, but not limited to: a twisted pair flat cable; a flexible PCB cable; a flat cable; or any other suitable cable. A flat cable is preferred to minimize the space taken by cable 36 within recess 20. Also, a flat cable 36 will tend to more easily form the curve as shown. The cable 36 may be shielded and/or armoured and/or filled; and may have be reinforced by, for example, a flexible strip of a plastics materials. Preferably, cable 36 passes through gap 34 at an angle of between 30° to 60°, more preferably 45°, so that cable 36 is biased towards the curve shape as shown.

The connector 22 may be a USB connector, IEEE 1394 connector, or otherwise as desired. As shown, the connector 22 is a reduced size USB connector of relatively constant height, width and length. Preferably, connector 22 has a plurality of contacts 38 for transmission of data and/or power. Connector 22 may not require a shield around contacts 38. Also, preferably a side wall 62 of the connector 22 is generally co-planar with end wall 18 when in recess 20; and recess 20 is of a height only slightly greater than the height of connector 22. In this way connector 22 is a relatively snug fit in recess 20.

Cable 36 is connected to connector 22 on one side 23 of connector 22 to again enhance cable 36 forming the curve as shown, as to allow the side 23 to assist in protecting the connection.

There is preferably a projection 40 from side wall 26 towards side wall 28, and with its outer surface generally aligned with opening 32, and thus substantially co-planar with wall 18. Projection 40 has an inner end 42 that is spaced from side wall 28 by a distance substantially the same as the axial length of connector 22. The distance between walls 26, 28 should be the same as or greater than the length of connector 22 and a short length of cable 36 curved at a reasonable radius. In this way an outer end 44 of connector 22 will rest against wall 28, and cable 36 will rest against wall 26, such that connector 22 is held in a relatively snug fit in recess 22. The projection 40 has an inner wall 41 that is preferably curved, with the radius of curvature being approximately of that of the curve of cable 36.

In this way, connector 22 can easily be inserted into recess 20, removed from recess 20, and stored in recess 20, without undue difficulty; and without undue stress on cable 36.

When connector 22 is in recess 20, cable 36 passes between connector 22 and rear wall 30. In this way connector 22 is biased away from rear wall 30 and towards open face 32 by the natural resiliency of cable 36. Projection 40 assists in protecting cable 36 at its join with connector 22.

To assist retaining connector 22 in position relative to recess 20, there may be provided a retaining clip. This may be of any suitable form such as, for example, a spring arm 44 extending outwardly from rear wall 30 and having a ball projection 46 to engage a correspondingly sized and shaped indent 48 in a top 50 of connector 22; and/or a small projection 52 integrally formed with wall 28 so that connector 22 engages behind projection 52 in the manner of a snap fit; or otherwise as desired or required. There may be inner and outer projections 52 to engage on either side of shield 54 of connector 22 to accurately locate connector 22.

Opposite projection 40, walls 18 and 28 have a small indentation 43 at their junction 45 to enable a finger tip of a user to be able to contact connector 22 to remove connector 22 from recess 20. The indentation may be full height, or for only a part of the height.

Figure 1:
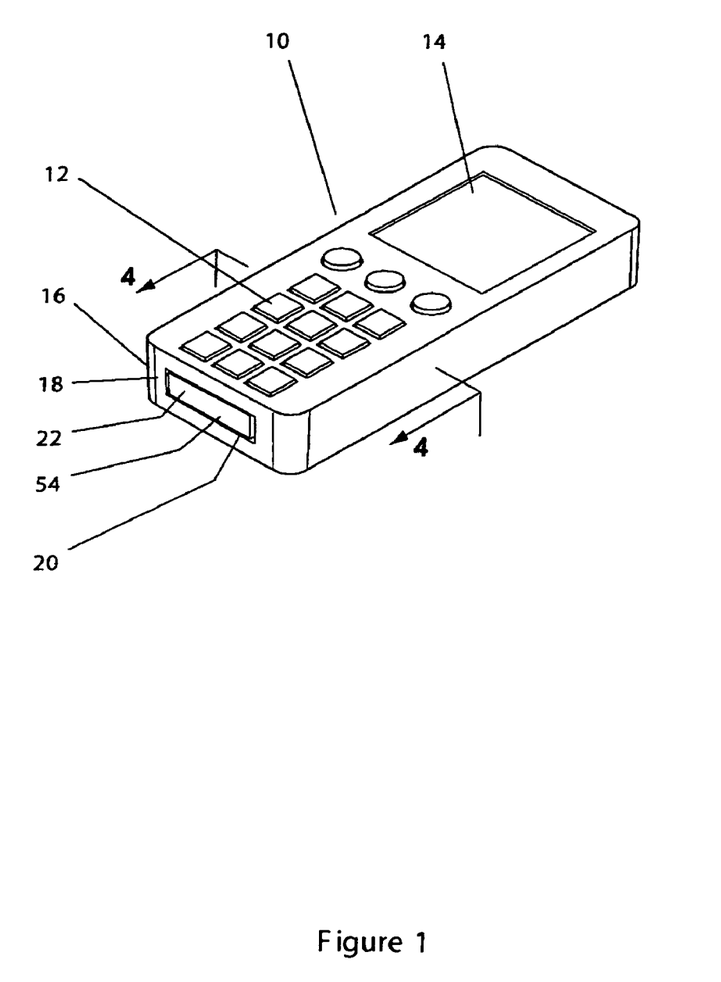
FIG. 1 is a perspective view of a portable device fitted with a connection apparatus and system of the present invention.
Figure 2:
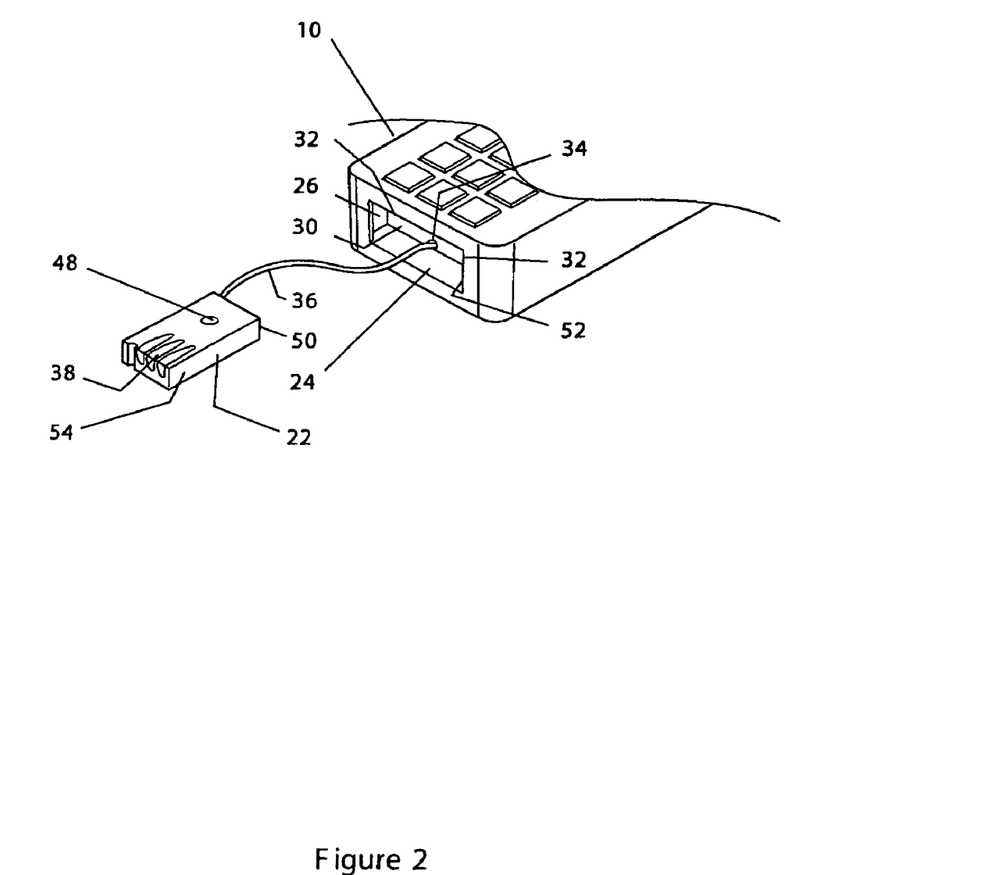
FIG. 2 is a view of the embodiment of FIG. 1 with the connection apparatus extended.
Figure 3:
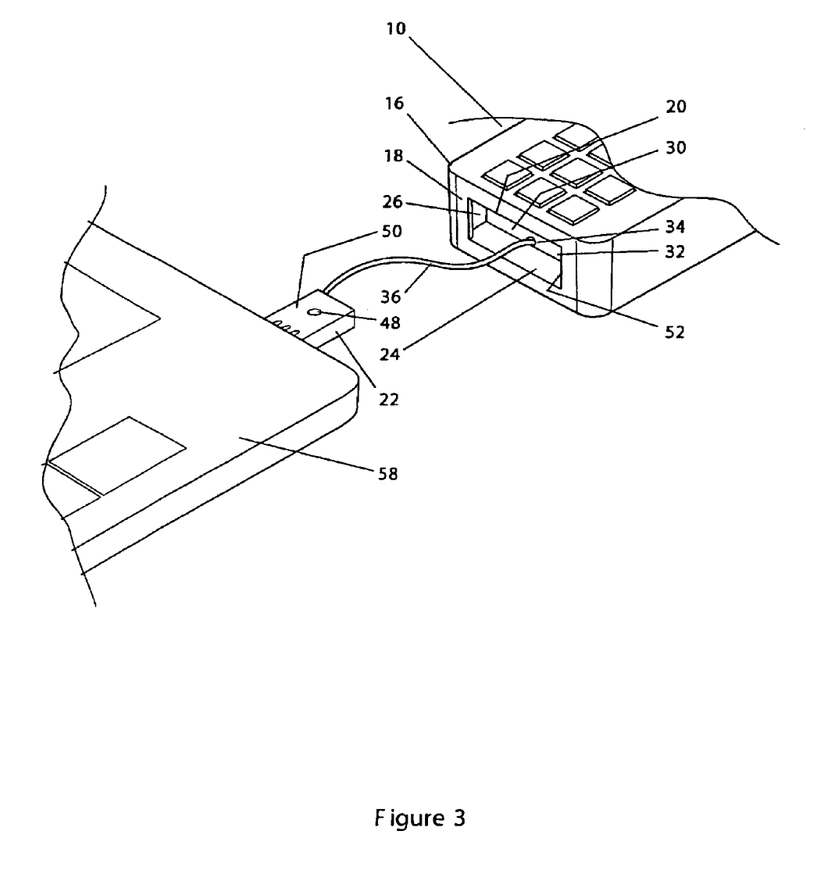
FIG. 3 is a view corresponding to FIGS. 1 and 2 with the portable device connected to a computer using the connection apparatus.

In this way connector 22 can be stored in recess 20. When required to be used, simple finger pressure can remove connector 22 from recess, and cable 36 then extended. Cable 36 may have a spring biased winding drum 56 around which it may automatically be wound and unwound, if desired. Upon cable 36 being extended as required, connector 22 can engage in a suitable port in a computer 58 for data and/or power transfer.

Preferably, data transfer may be both ways, but when portable device 10 is connected to computer 58, power transfer is only from the computer 58 to the portable device 10. In this instance, computer 58 is acting as the host, and portable device 10 is acting as an accessory/peripheral device to the host computer 58. This would also apply if connector 22 was used with a recharger for any battery in portable device 10.

However, for other portable devices, or small electronic devices, the portable device 10 may become the host, and the small electronic device may become the accessory/peripheral device. For example, headphone/earphone sets; handsfree sets; memory modules; Bluetooth-enable headset module; MP3 players; radio module; digital clocks/watches; another portable device; and so forth. In this case, power may be able to pass from the portable device 10 to the small electronic device. The use of the power may be for recharging any battery in the small electronic device.

By having connector 22, it is possible to easily transfer data and/or power (including music data) to and from the portable device 10 from computer 58, to and from portable device and or a small electronic device. Recharging may be for the portable device 10, or by the portable device 10.

Figure 6:
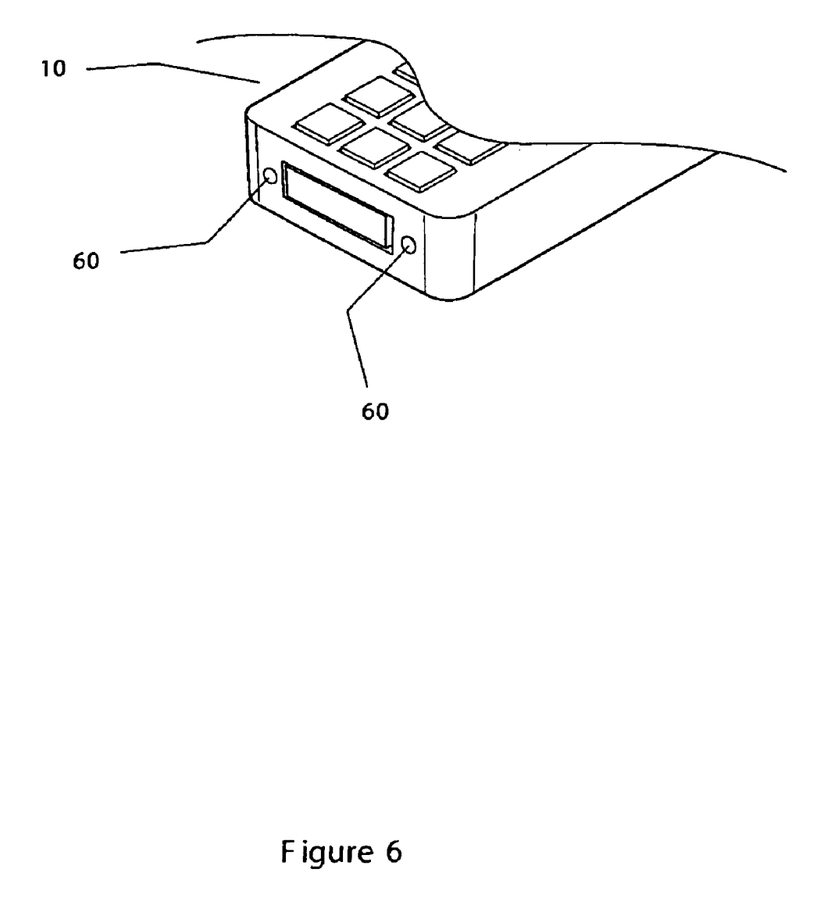
FIG. 6 is a view corresponding to FIG. 1 of a second embodiment.

FIG. 6 shows a variation of the embodiment of FIGS. 1 to 5. It is the same in all respects as the embodiment of FIGS. 1 to 5 except that one or two jacks 60 are provided for recharging and/or handsfree set connections.

Whilst there has been described in the foregoing description preferred embodiments of the present invention, it will be understood by those skilled in the technology concerned that many variations or modifications in details of design, construction or operation may be made without departing from the present invention.

What is claimed is:

1. A connection apparatus for a portable device, the connection apparatus including:
   (a) a recess in a wall of the portable device for releasably receiving therein a connector and a connector cable, the recess comprising a rear wall with a gap therein for the passage therethrough of the connector cable, the connector cable extending between the gap and the connector with a curved shape when the connector is in the recess, the connector cable passing through the gap at an angle to the rear wall so as to bias the connector cable to the curved shape;
   (b) the connector cable having an inner end for permanent connection to internal circuitry of the portable device, and an outer end connected to the connector;
   the connector and the connector cable being for enabling:
   (c) data transfer both ways between the portable device and another device, and power one way to the portable device from the another device, when the another device is a host for the portable device; and
   (d) data transfer both ways between the portable device and the another device, and power transfer both ways between the portable device and the another device, when the portable device is the host for the another device.

2. Apparatus as claimed in claim 1, wherein the connector is selected from the group consisting of: USB, and IEEE 1394;
   the connector cable being connected to the connector at a first side of the connector.

3. Apparatus as claimed in claim 1, further including a retaining clip to releasably retaining the connector in the recess when not in use, the retaining clip being selected from the group consisting of:
   a spring arm extending outwardly from a rear wall of the recess and having a ball projection adapted to engage a correspondingly sized and shaped recess in a top of the connector, and
   a small projection integrally formed with a side wall of the recess such that the connector engages behind the small projection in the manner of a snap fit.

4. Apparatus as claimed in claim 1, wherein when the connector is in the recess, the first side surface of the connector is substantially coplanar with the wall.

5. Apparatus as claimed in claim 1, wherein the recess is sized, shaped and located to not interfere with any operation of a plurality of keys of the portable device.

6. Apparatus as claimed in claim 5, wherein the recess further comprises:
   (a) two parallel opposed side walls;
   (b) a rear wall extending between and joining the opposed side walls;
   (c) a lower wall and a top wall both extending between and joining the two opposed side walls and the rear wall.

7. Apparatus as claimed in claim 6, wherein there is projection extending from a first wall of the two parallel, opposed side walls towards the second wall of the two parallel, opposed side walls;
   the projection having an inner end spaced from the second wall by a distance substantially the same as a length of the connector;
   the projection also having an inner curved surface to facilitate the connector cable forming a curved shape when in the recess.

8. Apparatus as claimed in claim 1, wherein the angle is in the range 30° to 60°.

9. Apparatus as claimed in claim 1, wherein the first wall is spaced from the second wall by a distance greater than the length of the connector.

10. Apparatus as claimed in claim 1, wherein when the connector is in the recess, the connector cable passes between the connector and the rear wall and biases the connector away from the rear wall.

11. Apparatus as claimed in claim 1, further including a retaining clip to releasably retain the connector in the recess when not in use.

12. Apparatus as claimed in claim 11, wherein the retaining clip is selected from the group consisting of:
    a spring arm extending outwardly from the rear wall of the recess and having a ball projection adapted to engage a correspondingly sized and shaped recess in a top of the connector, and
    a small projection integrally formed with one of the two side walls of the recess such that the connector engages behind the small projection in the manner of a snap fit.

13. Apparatus as claimed in claim 12, wherein there is projection extending from a first wall of two parallel, opposed side walls of the recess and extending towards a second wall of the two parallel, opposed side walls.

14. Apparatus as claimed in claim 13, wherein the first wall is spaced from the second wall by a distance greater than the length of the connector.

15. Apparatus as claimed in claim 14, wherein when the connector is in the recess, the connector cable passes between the connector and the rear wall and biases the connector away from the rear wall.

16. A portable device comprising:
    (a) a casing with at least one function key,
    (b) a recess in a wall of the casing for accommodating a connector when the connector is not in use,
    (c) a connector cable for permanently connecting the connector to an internal circuitry of the portable device;
    (d) the recess being sized, shaped and located to as to not interfere with operation of the at least one function key;
    (e) the connector, when in the recess, having a side surface substantially coplanar with the wall; and
    (f) the recess comprising a rear wall with a gap therein for the passage therethrough of the connector cable, the connector cable extending between the gap and the connector with a curved shape when the connector is in the recess, the connector cable passing through the gap at an angle to the rear wall so as to bias the connector cable to the curved shape.

17. A portable device as claimed in claim 16, wherein the connector and the connector cable are for enabling:
    (a) data transfer both ways between the portable device and another device, and one way power to the portable device from the another device, when the another device is a host for the portable device; and
    (b) data transfer both ways between the portable device and the another device, and power transfer both ways between the portable device and the another device, when the portable device is the host for the another device.

18. A portable device as claimed in claim 16, wherein the connector is selected from the group consisting of: USB, and IEEE 1394;

the connector cable being connected to the connector at a first side of the connector.

19. A portable device as claimed in claim 16, further including a retaining clip to releasably retain the connector in the recess when not in use.

20. A portable device as claimed in claim 19, wherein the retaining clip is selected from the group consisting of:

a spring arm extending outwardly from a rear wall of the recess and having a ball projection adapted to engage a correspondingly sized and shaped recess in a top of the connector, and a small projection integrally formed with a side wall of the recess such that the connector engages behind the small projection in the manner of a snap fit.

21. A portable device as claimed in claim 16, wherein the recess is sized, shaped and located to not interfere with any operation of a plurality of keys of the portable device.

22. A portable device as claimed in claim 21, wherein the recess has two parallel opposed side walls, the rear wall extending between and jointing the opposed side walls;

a lower wall and a top wall both extending between and joining the two opposed side walls and the rear wall, the lower wall being spaced from and parallel to the top wall; the angle being in the range 30° to 60°.

23. A portable device as claimed in claim 22, wherein there is projection extending from a first wall of the two parallel, opposed side walls towards the second wall of the two parallel, opposed side walls;

the projection having an inner end spaced from the second wall by a distance substantially the same as a length of the connector;

the projection also having an inner curved surface to facilitate the connector cable forming a curved shape when in the recess.

24. A portable device as claimed in claim 23, wherein the first wall is spaced from the second wall by a distance greater than the length of the connector.

25. A portable device as claimed in claim 23, wherein when the connector is in the recess, the connector cable passes between the connector and the rear wall and biases the connector away from the rear wall.

26. A portable device as claimed in claim 22, further including a retaining clip to releasably retain the connector in the recess when not in use.

27. A portable device as claimed in claim 26, wherein the retaining clip is selected from the group consisting of:

a spring arm extending outwardly from the rear wall of the recess and having a ball projection adapted to engage a correspondingly sized and shaped recess in a top of the connector, and a small projection integrally formed with one of the two side walls of the recess such that the connector engages behind the small projection in the manner of a snap fit.

28. A portable device as claimed in claim 27, wherein there is projection extending from a first wall of the two parallel, opposed side walls towards the second wall of the two parallel, opposed side walls;

the projection having an inner end spaced from the second wall by a distance substantially the same as a length of the connector.

29. A portable device as claimed in claim 28, wherein the first wall is spaced from the second wall by a distance greater than the length of the connector.

30. A portable device as claimed in claim 29, wherein when the connector is in the recess, the connector cable passes between the connector and the rear wall and biases the connector away from the rear wall.

* * * * *